Aug. 19, 1941.  H. HEINEKE ET AL  2,253,125
FISHING HOOK, PARTICULARLY FOR THE CATCHING OF BIG FISH
Filed April 4, 1940

Inventors,
Heinrich Heineke & Walter Hauschild,
by Frank S. Appleman,
Attorney

Patented Aug. 19, 1941

2,253,125

UNITED STATES PATENT OFFICE 2,253,125

FISHING HOOK, PARTICULARLY FOR THE CATCHING OF BIG FISH

Heinrich Heineke, Hamburg-Altona, and Walter Hauschild, Hamburg-Rissen, Germany

Application April 4, 1940, Serial No. 327,924
In Germany July 26, 1939

2 Claims. (Cl. 43—1)

The subject of this invention is a fishing hook with firing mechanism.

In the case of hooks of this description already known, the firing mechanism is a fairly large unit lying alongside the hook and parallel to its shaft. It can therefore not be covered over by a bait, and consequently when fishing it is visible to the fish, so that many of the fish are frightened away without biting. When a fish takes such a fishing hook, owing to the situation of the firing mechanism alongside the hook, there is no guarantee that the released projectile will kill or at least stun the fish.

The fishing hook constituting the subject of the present invention, which is intended particularly for the catching of big fish, eliminates these shortcomings.

The invention consists in general of certain novel details of construction and combinations of parts hereinafter fully described, illustrated in the accompanying drawing and particularly claimed.

Figure 1:
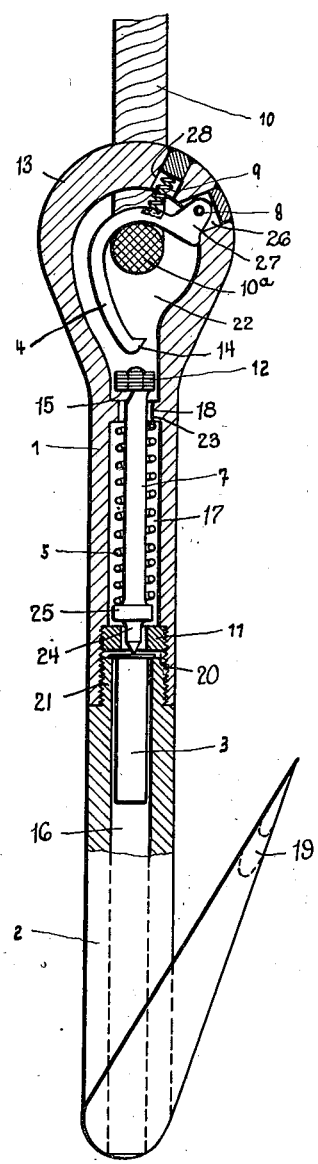

In the accompanying drawing, like characters of reference indicate like parts in the several views, and Fig. 1 is a side elevation partly in section of a fishing hook with a firing mechanism built into it and in the released position.

Figure 2:
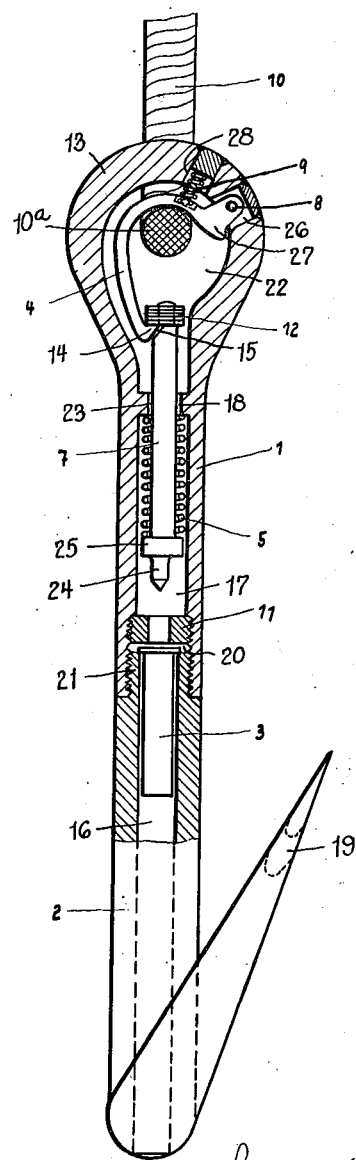

Fig. 2 shows a fishing hook in accordance with Fig. 1, with the firing mechanism ready for firing.

The hook forming the body of this invention comprises an upper tubular shank portion 1 and a lower tubular shank portion 2. The upper portion has an enlarged and internally threaded bore 20 at its lower end and the upper end of the portion 2 is reduced and externally threaded as at 21 to screw into the bore 20 so that the two parts of the shank are separably connected. The threaded bore 20 is sufficiently deep to admit of a collar 11 being screwed in the upper part thereof. The bore 17 of the portion 1 is reduced at its upper end by an internal flange 18 and above the flange 18 the portion 1 terminates in an eye 13. Slidable through the opening 23 formed by the flange 18 is a firing pin 7 having a pointed lower end 24 of such diameter and length that it may pass through the opening of the collar 11. A stop collar 25 is provided on this firing pin to limit the downward movement of the pin by engagement with the collar 11. The collar 25 also serves as the lower seat of a coiled compression firing spring 5 which has its upper end seated against the flange 18.

In one side of the eye 13 is formed a recess or pocket 26. A curved latch member 4 lies in the opening 22 of the eye 13 and adjacent one end this latch member is provided with a lug 27 which extends into the pocket 26. A pivot pin 8 passes through the lug 27 and has its ends engaged in the walls of the pocket so that the member 4 may swing thereon. At its other end the member 4 is provided with a beveled finger 14 adapted to engage in a notch 15 formed beneath the head 12 of the firing pin. A spring 9 has one end seated against the member 4 and its other end seated in a recess 28 formed in the eye 13. The spring 9 biases the member 4 in such manner that the finger 14 is urged into position of engagement with the notch 15. The fish line 10 is looped around the member 4 as at 10a.

The upper end of the bore 16 of the portion 2 forms a chamber for the reception of a cartridge 3 and this bore 16 extends the full length of the portion 2 to open through the lower end thereof. A barb or point 19 extends from the lower end of the portion 2.

To prepare the device for use, the portions 1 and 2 are separated by unscrewing. The head 12 is grasped and the firing pin retracted until the finger 14, which has been pushed aside by upward movement of the head, has been passed by the head 12 and engages in the notch 15. A cartridge is inserted in the bore 16 which thus forms a barrel and the parts screwed together. A bait is now placed on the hook, the bait being preferably of sufficient length to conceal the hook. If now a fish gives a sudden jerk on the hook, the member 4 will be biased by action of the loop 10a, the firing pin will be released to strike the cartridge and the latter will be discharged, thus killing or stunning the fish.

What we claim is:

1. In combination, a fish hook having a tubular shank forming a barrel adapted to contain a cartridge in its lower portion and open for discharge at its lower end, a spring actuated firing pin in the upper part of said shank and projecting above the shank, said firing pin having latch engaging means at its upper end, an eye on the upper end of the shank, a latch member in said eye and pivoted at one side of the eye, said latch member being curved for engagement by the loop of a fish line and engageable with said latch engaging means upon retraction of the firing pin, and a spring between the side of said eye and latch member and resisting releasing movement of the latch member.

2. In combination, a fish hook having a tubular shank forming a barrel adapted to contain a cartridge in its lower portion and open for discharge at its lower end, a spring actuated firing pin in the upper part of said shank and projecting above the shank, said firing pin having latch engaging means at its upper end, an eye on the upper end of the shank, a latch member in said eye and pivoted at one side of the eye, said latch member being curved for engagement by the loop of a fish line and engageable with said latch engaging means upon retraction of the firing pin, and a spring between the side of said eye and latch member and resisting releasing movement of the latch member, said shank comprising upper and lower screw connected portions, the upper portion holding the firing pin, and the upper end of the lower portion being adapted to hold the cartridge.

HEINRICH HEINEKE.
WALTER HAUSCHILD.